(12) United States Patent
Kramer et al.

(10) Patent No.: US 7,343,520 B2
(45) Date of Patent: Mar. 11, 2008

(54) COMMON BUILT IN TEST (BIT) SOFTWARE ARCHITECTURE

(75) Inventors: Matthew T. Kramer, Redondo Beach, CA (US); Kenneth B. Hitt, Cerritos, CA (US)

(73) Assignee: Raytheon Company, Waltham, MA (US)

( * ) Notice: Subject to any disclaimer, the term of this patent is extended or adjusted under 35 U.S.C. 154(b) by 619 days.

(21) Appl. No.: 10/404,604

(22) Filed: Apr. 1, 2003

(65) Prior Publication Data

US 2004/0199822 A1    Oct. 7, 2004

(51) Int. Cl.
*G06F 11/00* (2006.01)
(52) U.S. Cl. ...................................... 714/30
(58) Field of Classification Search ............... 714/25, 714/30, 31
See application file for complete search history.

(56) References Cited

U.S. PATENT DOCUMENTS

| | | | | |
|---|---|---|---|---|
| 4,520,440 A | * | 5/1985 | Buonomo et al. | 714/25 |
| 5,764,655 A | * | 6/1998 | Kirihata et al. | 714/733 |
| 6,029,257 A | * | 2/2000 | Palmer | 714/40 |
| 6,073,253 A | * | 6/2000 | Nordstrom et al. | 714/25 |
| 6,219,626 B1 | * | 4/2001 | Steinmetz et al. | 702/183 |
| 6,643,798 B2 | * | 11/2003 | Barton et al. | 714/25 |
| 6,654,707 B2 | * | 11/2003 | Wynn et al. | 702/186 |
| 6,880,116 B2 | * | 4/2005 | Man et al. | 714/718 |
| 6,938,243 B1 | * | 8/2005 | Zeevi et al. | 717/124 |
| 2002/0091966 A1 | * | 7/2002 | Barton et al. | 714/25 |

* cited by examiner

*Primary Examiner*—Scott Baderman
*Assistant Examiner*—Paul F Contino
(74) *Attorney, Agent, or Firm*—Leonard A. Alkov

(57) ABSTRACT

A method for conducting a built in test on a system having a central processing unit (CPU), connected to one or more storage means, an input/output means and a plurality of assemblies PCI1, PCI2 . . . PCIN to be tested. A test initiator, generally a system wide operating system running on a system CPU, starts the test. Each of the assemblies to be tested has an identified and a test requirement, presented in a format common for, and applicable to, a plurality of central processing units and associated assemblies.

9 Claims, 4 Drawing Sheets

TYPICAL TEST RESULTS TABLE

| WORD 1 ID NUMBER | 402 |
| WORD 2 NUMBER PASSED | 404 |
| WORD 3 NUMBER FAILED | 406 |
| WORD 4 FAILURE ADDRESS | 408 |
| WORD 5 EXPECTED VALUE | 410 |
| WORD 6 OBSERVED VALUE | 412 |
| WORD 7 STATUS FLAG | 414 |
| WORD 8 SPARE | 416 |

FIG 4

COMMON BUILT IN TEST (BIT) SOFTWARE ARCHITECTURE

BACKGROUND OF THE INVENTION

1. Field of Invention

This invention is in the field of a software built in test (BIT) method associated with an assembly having one or more digital processors.

2. Description of the Related Art

The complexity of assemblies containing digital processors is increasing with every product generation. The increased complexity requires detailed testing to insure all hardware and software functions are functioning within specifications.

Historically, the BIT functions implemented in software were typically called directly and individually. That meant that each BIT function was customized for each particular hardware configuration. This customized aspect required writing BIT routines for each test call requiring many man-months of effort.

Because of the diversity of BIT programs, results from each individual program had to be interpreted, cataloged, and compared to a norm or pass/fail considerations. In some cases there was code duplication. The possibility of faulty test software was likely. Maintainability of test code was difficult as each BIT software module was different from the next, using specific subroutines having characteristics different for each implementation. This uniqueness of each BIT program sometimes forced the rebuild of the software, a full acceptance test cycle and/or manual re-programming of the digital processor to allow the change of a single test parameter. Because of the unique nature of the test programs, sometimes the assembly was returned to the manufacturer for modification instead of performing the change in the field and avoiding the shipping time delay and expense.

SUMMARY OF THE INVENTION

Above limitations are avoided by a method for conducting a built in test on a system having a central processing unit (CPU) 301, said central processing unit 301 connected to a one or more storage means such as 305,307,309, an optional input/output means 317, and a plurality of exemplary assemblies PCI1, PCI2 . . . PCIN to be tested. Said input/output means also connected to a test initiator, generally a system wide operating system running on a system CPU, separate and distinct from said CPU 301. Each of said assemblies to be tested has an identifier and a test requirement, presented in a format common for and applicable to a plurality of central processing units and associated assemblies. The method comprising the steps of:

initiating a test call 202 from the test initiator optionally using the input/output means 317, to said central processing unit 301, said test call 202 containing an identifier defining one or more tests for one or more of said plurality of assemblies to be tested;

interpreting said identifier in a test executive 101 executing using said central processing unit 301 to find one or more enabled tests applicable to said one or more of said plurality of assemblies PCI1, PCI2 . . . PCIN to be tested listed within a BIT reconfiguration table 206 and using said identifier to extract test parameters 117 specific for said one or more assemblies to be tested by said test call 202 from said BIT reconfiguration table 206;

transmitting said test parameters 117 by said test executive 101 to a test code 107 for execution of said built in test on one or more of said assemblies to be tested;

executing said built in test on one or more of said assemblies to be tested using said test parameters 117 within said test code 107 for each of said assemblies;

transmitting test code test results 121 from said test code 107 to test executive 101;

storing test code results 121 in a test results table 109 using said test executive 101;

generating test executive results 111 in said test executive 101 to report which tests were performed;

reporting said test executive results 111 to said test initiator.

Said test initiator may reside within the CPU and/or assemblies to be tested, thus avoiding the need for input/output means.

Said identifier within test call 202 has a format for testing each of said plurality of assemblies so that said format for said identifier for said assembly PCI1 has the same number of bits and structure as that for said assemblies PCI2 . . . PCIN.

Said BIT reconfiguration table has an enable bit and number of loop iterations stored within said BIT reconfiguration table for each of said plurality of assemblies.

For each assembly to be tested said test results table has eight words. Each of the words has 32 bits. Said 8 words within said test results table are allocated for test identification, number of passed executions of said test, number of failed executions of said test, expected data for said test, observed data for said test, memory location 30 within said storage means for location of data descriptive of failed test, status flags and spare.

BRIEF DESCRIPTION OF THE DRAWING

In the Drawing:

FIG. 4 is a typical structure for a test results table.

DETAILED DESCRIPTION

This invention introduces a standardized, common Built in Test (BIT) applicable to a number of hardware/software configurations. The BIT minimizes the requirements of customization of the BIT function from product to product or program to program.

Figure 1:
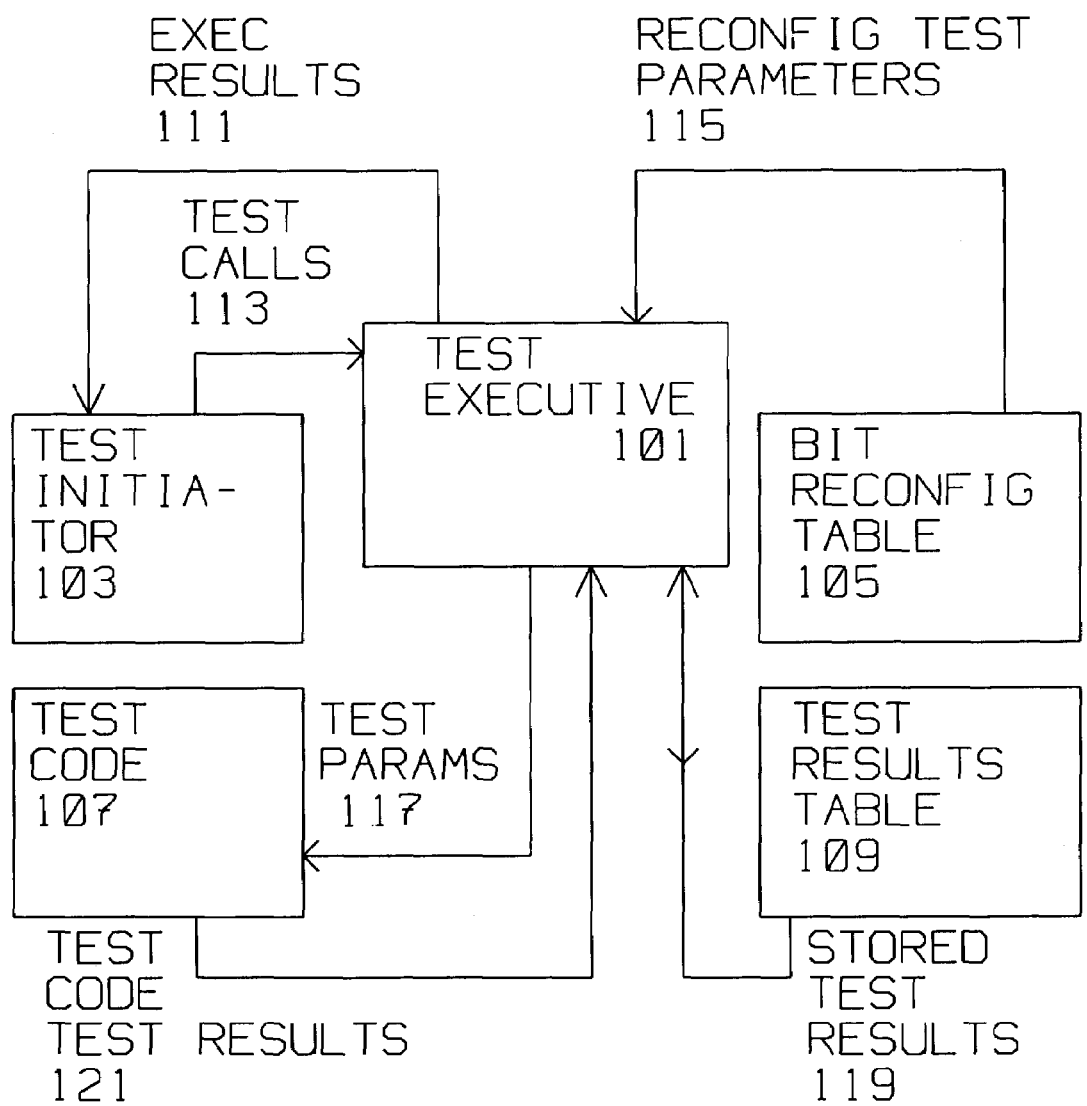
FIG. 1 is the structure of the present invention.

As shown in FIG. 1, the test software of this invention has four main components:

a) the Test executive 101;
b) the BIT reconfiguration table 105;
c) the test code 107; and
d) the test results table 109.

Test initiator 103 calls the test executive 101 to initiate the BIT test function for a particular hardware configuration. Test initiator 103 is typically the operating system, and may call on test executive 101 during boot time or at specific time intervals as required.

Test executive 101 is central to the architecture. Test executive 101, when commanded by test initiator 103, responds to test calls 113 from test initiator 103. The relevant tests for a particular hardware/software configuration to be executed by test executive 101 are stored in the BIT reconfiguration table 105. The particular test code to be executed by the configuration under test is stored in test code 107. Test executive 101 presents test parameters 117 to test code 107. As test code 107 completes its tasks, it returns to test executive 101 the test code test results 121 obtained from a particular test. These test code test results 121 are processed within test executive 101. During processing, test executive 101 generates stored test results 119 in view of applicable test calls 113, and places stored test results 119 into test results table 109. Also, test executive 101 may read test results table 109 to compare results generated previously for comparison with current test code results 121 from test code 107. A list of the tests executed by executive 101 are executive results 111. Executive results 111 are reported back to test initiator 103, typically the operating system. The number of times a test is iterated is contained within Bit reconfiguration Table 105.

Figure 2:
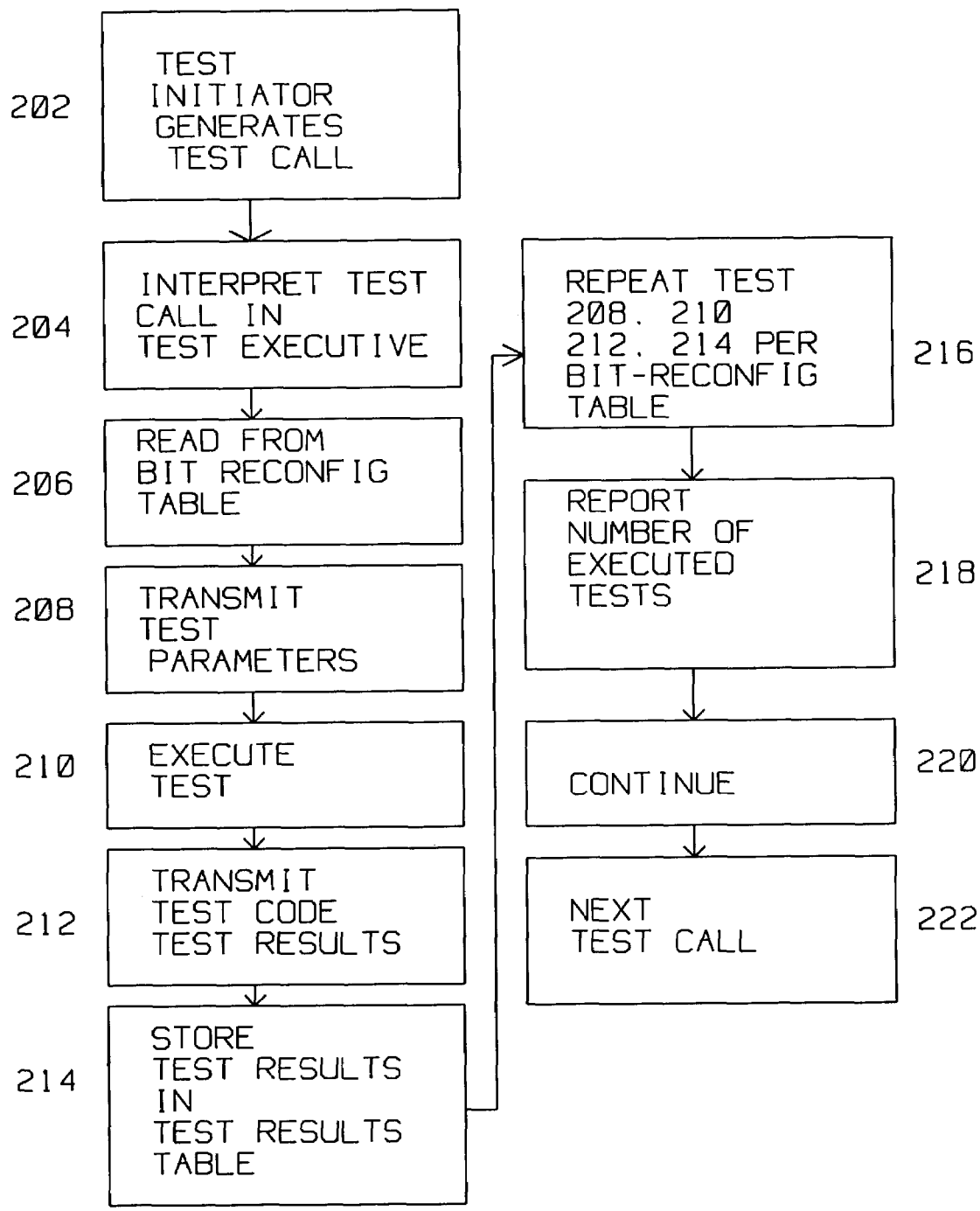
FIG. 2 shows the method steps for using the present invention.

Given above structure, the method for conducting a typical BIT test is shown in FIG. 2. FIG. 2 shows the sequence of steps for conducting a BIT test in accordance with this invention:

a) generating test call 202—(high level) test call 202 is generated by test initiator 103, for execution of a particular type of test;

b) interpreting test call 204—test executive 101 interprets the test call 202;

c) reading BIT reconfiguration table 206—test executive 101 reads BIT reconfiguration table 105 for test parameters pertinent to the BIT test defined above in step 202;

d) transmitting test parameters 208—test parameters 117 are sent to test code 107 for execution of the actual BIT test;

e) executing test 210—executes BIT test specific to hardware/software configuration as detailed by test code 107;

f) transmitting test code test results 212—Test code test results 121 are generated by test code 107 and reported to test executive 101;

g) storing test result in test results table 214—Test executive 101 stores test code test results 121 in test results table 109;

h) repeat test 216—Repeat the sequence d through g inclusive, transmitting test parameters 208, executing test 210, transmitting test code results 212 and storing test results 214 per loop iteration value specified in Bit reconfiguration table 105;

i) reporting executed tests 218—report to test initiator 103 which of the requested tests were executed;

j) continue 220—test executive prepares for the next test call from the operating system; and k) next call 222—initiates the BIT test process as initially done with test call 202.

When using the C programming language as an example, test call 202 is computed from:

result=bitTestExec(int32groupNumber,
   int32testSelection);

result is placed in the test executive (111);

groupNumber is a 32 bit integer containing the identifier for which test group the desired test(s) belongs to;

testSelection is a 32 bit wide integer bit field of the desired test in said group.

In one embodiment, tests are arranged in the test executive 101 into groups of up to 32 individual tests each. These groups are defined such that all the tests within a group are executed at the same time. For example, the tests may be divided into Processor Group (group 1), RAM (group 2), PCI (group 3), System (group 4). During the boot sequence, at CPU or plurality of CPUs (system wide) start up, these tests can be interlaced with other non-test related operations. Using above method, the sequence of test calls is:

result = bitTestExec(3, 0xFFFFFFFF);

...

other miscellaneous code

...

result = bitTEstExec(4, 0xFFFFFFFF).

Using this format, setting all the bits in the testSelection parameter will run all ENABLED test on that group. However, if only PCI (group 3) test are to be run, then call 202 would be computed from:

result-bitTestExec(3,0x00000004)

Thus, with a testSelection value of hexadecimal "4", the third bit position is set, while all others are not set. This format indicates that test 3 is within that group. Using this format, test call 202 cannot run an arbitrary set of multiple tests, but only a set of tests that exist within a particular group. To span multiple groups will require multiple calls.

There is no algorithmic relationship the groupNumber/testSelection variables and a test's actual identifier as used in results table 109. Thus a lookup table is provided in the test executive that translates groupNumber and testSelection into a (true) test identifier.

This method of BIT testing allows the structure and format of test call 113 to be standardized over a large number of hardware/software configurations. Test Executive 101 interprets the test calls 113 from test initiator 103, thus allowing a standard test call 113 to all test executives in a system, avoiding specifics typical of differences in hardware/software configurations.

The differences for particular hardware/software configurations and related BIT tests for a particular CPU assembly are detailed in BIT reconfiguration table 105, test results 109 and test code 107, all contained in the assembly to be tested. Thus, test calls 113 can be standardized in test initiator 103 (the operating system), free from consideration of the hardware/software structure it is applied to.

BIT reconfiguration table 105 is the data file used for storing parameters and control settings for particular tests. Typically, BIT reconfiguration table 105 is created with software tools, such as word processors. The contents of BIT reconfiguration table are then programmed in non-volatile memory, such as programmable read only memory (PROM). The PROM is located and associated with the target test processor and hardware for conducting a specific BIT test. Typically, BIT reconfiguration table 105 is external to the to the test executive and test code, but more often internal to a particular hardware configuration the test executive 101 is running on. In some embodiments Bit reconfiguration table 105 is stored in a local PROM, for example PROM 305, or other storage. In other embodiments, BIT reconfiguration table 105 is stored in a central location to be transferred at boot up time and to multiple local storage locations, such as, for example, a plurality of RAM 307. Thus, multiple CPU/RAM structures can download BIT reconfiguration table 105 from one location, allowing a change to BIT reconfiguration table 105 to be input only once for a plurality of CPU/RAM structures.

In a typical embodiment, BIT reconfiguration table 105 contains multiple sections. The first section stores data to be used by Test Executive 101. The remaining sections can be accessed by application software for storage of data in any convenient format. Access to the data is provided by Test Executive 101. For example, Test Executive 101 API specifies a call that can instruct test initiator 103 where the requested section is located in RAM, so that it may be accessed directly:

address=bitGetSection(sectionNumber)

Test results table 109 contains the results of individual tests run by test executive 101 using test code 107. Generally, test results table 109 is located in random access memory (RAM) or other storage means accessible to the processor conducting the tests. Test code 107 has all the software codes required to perform tests. Test code 107 accepts as function parameters the contents of BIT Reconfiguration table 105 and run time parameters supplied by Test executive 101. Thus, because Test code 107 will execute commands contained within BIT reconfiguration table 105, subject only to a known, standard format, test code 107 is compatible with the the hardware being tested as well as test executive 101.

For example, test code 107 is written for Ethernet device #2 in a first hardware structure A. This same test code can be used in a second hardware structure for an Ethernet device #3 by changing the device number from 2 to 3 in BIT reconfiguration table 105 present in both the first hardware structure and the second hardware structure. BIT reconfiguration table 105 contains test parameters, not executable code.

Another function of Test Code 107 is to generate a standardized, test code test results 121 structured to be compatible with Test executive 101. The format of test code results 121 is standardized, thus facilitating the communication with test executive 101, and containing hardware specific details in the content of the code, not its format or structure.

Figure 3:
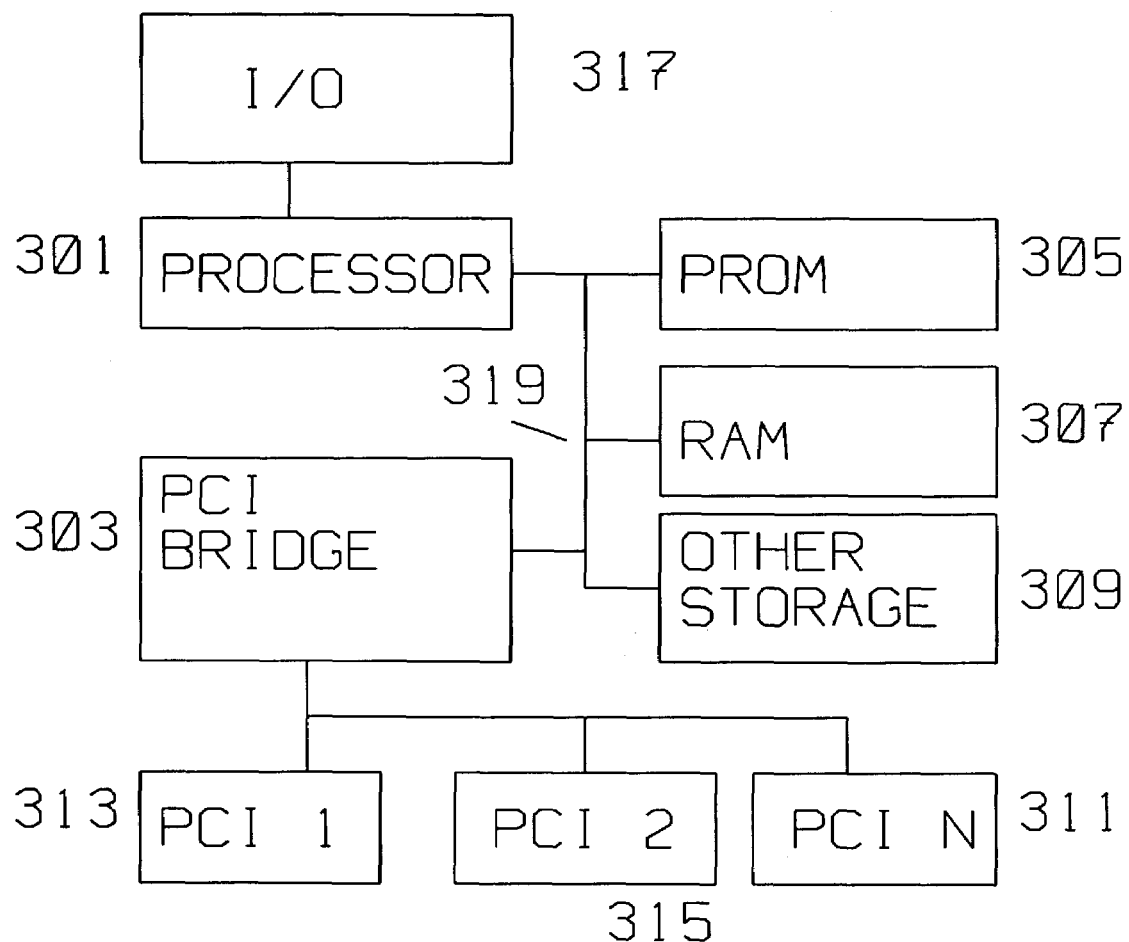
FIG. 3 is an exemplary hardware configuration for using the present invention.

FIG. 3 shows an example of typical hardware configuration using the test structure defined herein. Processor 301, typically an Intel 4, PowerPc or AMD CPU, connects to one or more storage means, such as, for example, PROM 305, RAM 307 and other storage 309 using a bus 319. The same bus 319 connects to PCI bridge 303. In turn PCI bridge 303 connects to PCI units 313 (PCI 1), 315(PCI 2), . . . 311 (PCI N). Each of the PCI units 313, 315 . . . 311 is typically a subsystem having a specific BIT test requirement. While exemplary PCI units are recited, PCI is only one example of interconnected units. Other examples are VME, Rapid-O or any other device inter-connect bus/unit combination.

In an embodiment applicable to the configuration of FIG. 3, as shown in FIG. 4, test results table 109 is an array consisting of a 32 byte entry for each unique test. Each 32 byte entry contains eight 32 bit words. Each of the eight 32 bit words of FIG. 4 are allocated in this manner:

Word 1—contains the test's unique identification number;
Word 2—number of times test has passed;
Word 3—number of times test has failed;
Word 4—address of recorded failure during test;
Word 5—expected value of memory at memory address of recorded failure during test;
Word 6—observed value of memory at memory address of recorded failure during test;
Word 7—status flags indicating results of the tests during the most recent execution;
Word 8—spare.

Word 4, word 5 and word 6 are modified only the first time a test fails. Word 4, address of recorded failure, provides a location generally descriptive of failure location, memory or otherwise. For example, if a RAM test failed while trying to write a pattern to RAM at address 0×0010FFEC, the 0×0010FFEC memory address is written in word 4. In a data transfer test, for example, where memory is not involved, it is used to indicate which data word in the transferred data failed a checksum test.

The loop iteration value contained within Bit Reconfiguration Table (105) causes the test executive to repeat steps 208, 210, 212 and 214 in FIG. 2 by the amount stated.

A method outlined herein is best used for conducting a built in test on a system having a plurality of central processing units and associated assemblies. For example, each of said central processing units 301 is connected to one or more storage means 305,307,309, an optional input/output means 317 and a plurality of typical assemblies PCI1, PCI2 . . . PCIN as shown in FIG. 3. In one embodiment, the input/output means is also connected to a test initiator 103. The method for a plurality of CPU's comprises the steps of:

1) sending a test call 113 from initiator 103 to a first of said central processing units, said test call 113 formatted with a first format, said first format used for all test calls 113 used to initiate said built in test on any of said central processing units part of said plurality of central processing units or said plurality of assemblies connected thereto.

2) interpreting the test call 113 using the first of said central processing units. This is the CPU the test call was directed to. This step is completed using the contents of a BIT reconfiguration table. The BIT reconfiguration table is resident within the storage means connected to the first of said central processing units to extract a first built in test parameters contained within said BIT reconfiguration table. The test parameters are specific for the first of said central processing units and plurality of assemblies connected thereto.

3) executing the test parameters using the first of the central processing units.

4) storing test results obtained from executing the test parameters within the storage means.

5) comparing the test results with stored values using the first of said central processing units to obtain a report.

6) sending said report to the test initiator 103.

Test initiator 103 can have many forms. In one case, it is the operating system running on a system CPU, where the system CPU is not part of the plurality of central processing units. In another example, test initiator 103 can be resident in a plurality of CPUs forming a larger system. In such a distributed example, each CPU acts as a test initiator 103.

The interface means to the central processing units 103 is not limited to the I/O channel. Another embodiment option is to share memory space within RAM 307 between the system CPU and the first of the plurality of CPU's 301. Now CPU 301 can initiate a BIT based on memory contents within RAM 307. Direct CPU control can also be used, such as COPS and JTAG.

In the context of this invention, assemblies also mean the interaction of a plurality of units interconnected to separate CPUs. For example, performing a checksum of data sent from one device on one system to another device connected to another CPU is envisioned as assemblies for the purpose of this invention.

Although presented in exemplary fashion employing specific embodiments, the disclosed structures are not intended to be so limited. For example, although a single CPU is shown executing various BIT tests, it is envisioned that more than one CPU will concurrently share the plurality of method steps to complete the BIT tests. This is most beneficial where time for a single CPU to perform a BIT tests on a plurality of sub-assemblies is insufficient or there is excess computing power available on a shared bus between multiple CPUs.

Those skilled in the art will also appreciate that numerous changes and modifications could be made to the embodiment described herein without departing in any way from the invention. These changes and modifications and all obvious variations of the disclosed embodiment are intended to be embraced by the claims to the limits set by law.

The invention claimed is:

1. A method for conducting a built in test (BIT) within a system having one or more central processing units, said central processing units connected to storage means, and one or more assemblies to be tested, comprising the steps of:

initiating a test call from a test initiator using an input/output means to one or more of said central processing units, said test call descriptive of a test to be concurrently conducted on one or more of said assemblies to be tested using said central processing units;

interpreting said test call in a test executive, said test executive executing using one or more of said central processing units;

searching for test parameters stored in a BIT reconfiguration table within said storage means with said test executive, said storage means and said one or more of said central processing units located within said one or more assemblies to be tested;

transmitting said test parameters to a test code for execution of said BIT on one of said assemblies to be tested by said test executive in response to content of BIT reconfiguration table;

executing concurrently said BIT on one or more of said assemblies to be tested using said test parameters within said test code;

transmitting said test code test results from said test code to said test executive;

storing code test results in a test results table using said test executive; and reporting test executive results to said test initiator using said test executive, wherein said test initiator is an operating system on a system central processing unit running concurrently with said one or more central processing units; and wherein said test initiator running on said system central processing unit shares said storage means with said one or more central processing units.

2. An apparatus for conducting a built in test (BIT) comprising:

one or more central processing units, said one or more central processing units connected to one or more storage means and one or more assemblies to be tested, said storage means and said one or more central processing units located within said one or more assemblies to be tested, wherein a test initiator initiates a test call from said test initiator using an input/output means to said one or more central processing units, said test call descriptive of a test to be concurrently conducted on one or more of said assemblies to be tested;

means for receiving said test call in a test executive, said test executive executing using said one or more central processing units;

means for enabling said test executive to read a BIT reconfiguration table for test parameters called by said test call, said BIT reconfiguration table within said storage means;

means for transmitting test parameters to a test code for execution of said BIT on one of said assemblies to be tested in response to reading of said BIT reconfiguration table by said test executive;

means for concurrently executing said BIT on one or more of said assemblies to be tested using said test parameters within said test code;

means for transmitting test code test results from said test code to said test executive;

means for storing code test results in a test results table using said test executive;

means for reporting test executive results to said test initiator using said test executive, wherein said test initiator is an operating system running on a system central processing unit running concurrently with said one or more central processing units; and wherein said test initiator is running on said system central processing unit shares said storage means with said one or more central processing units.

3. A method for conducting a built in test (BIT) on a system having one or more central processing units, said central processing units connected to one or more storage means, and a plurality of assemblies PCI1, PCI2 . . . PCIN to be tested, said storage means and said one or more central processing units located within said plurality of assemblies PCI1, PCI2 . . . PCIN, each of said assemblies to be tested having an identifier and a test requirement, comprising the steps of:

initiating a test call from a test initiator, using an input/output means, said test initiator originating from a system central processing unit to one or more of said central processing units, said test call containing an identifier defining one or more tests for one or more of said plurality of assemblies to be concurrently tested;

interpreting said identifier in a test executive concurrently executing on said one or more central processing units to find one or more enabled tests applicable to said one or more of said plurality of assemblies to be tested listed within a BIT reconfiguration table and using said identifier to extract test parameters specific for said one or more assemblies to be tested by said test call from said BIT reconfiguration table, said BIT reconfiguration table contained within said storage means;

transmitting said test parameters by said test executive to a test code for execution of said built in test on one or more of said assemblies to be tested;

executing said built in test on one or more of said assemblies to be tested using said test parameters within said test code for each of said assemblies;

transmitting test code test results from said test code to said test executive;

storing code test results in a test results table using said test executive;

reporting test executive results to said test initiator using said test executive;

wherein said test initiator is generated by a system CPU; and wherein said test initiator is sent to one or more of said plurality of central processing units by sharing said one or more storage means with said system CPU.

4. A method for conducting a built in test as described in claim 3 wherein said identifier within test call has a format for testing each of said plurality of assemblies so that said format for said identifier for said assembly PCI1 has the same number of bits and structure as that for said assemblies PCI2 . . . PCIN.

5. A method for conducting a built in test as described in claim 3 wherein said BIT reconfiguration table has an enable bit and number of loop iterations stored within said BIT reconfiguration table for each of said plurality of assemblies.

6. A method for conducting a built in test as described in claim 3 wherein for each assembly to be tested said test results table has eight words.

7. A method for conducting a built in test as described in claim 6 wherein said 8 words within, said test results table are allocated for test identification, number of passed executions of said test, number of failed executions of said test, expected data for said test, observed data for said test, failure location within said storage means for location of data descriptive of failed test, status flags and spare.

8. A method for conducting a built in test as described in claim 6 wherein each of said 8 words within said test results table have 32 bits.

9. A method for conducting a built in test (BIT) on a system having a plurality of central processing units, each of said central processing units operating concurrently and connected to one or more a storage means, an input/output means and a plurality of assemblies PCI1, PCI2 . . . PCIN, said storage means and said central processing units located within said plurality of assemblies PCI1, PCI2 . . . PCIN, said input/output means also connected to a test initiator, comprising the steps of:

sending a test call from said initiator to a first of said central processing units, said test call formatted with a first format, said first format used for all test calls used to concurrently initiate said built in test on one or more of said central processing units part of said plurality of central processing units or said plurality of assemblies connected thereto;

interpreting said test call using said first of said central processing units, using the contents of a BIT reconfiguration table, said BIT reconfiguration table resident within said storage means connected to said first of said central processing units to extract a first built in test parameters contained within said BIT reconfiguration table, said test parameters specific for said first of said central processing units and plurality of assemblies PCI1, PCI2 . . . PCIN connected thereto;

executing said test parameters using said first of said central processing units;

storing test results obtained from executing said test parameters within said storage means;

comparing said test results with stored values using said first of said central processing units to obtain a report;

sending said report to said test initiator;

wherein said test initiator is generated by a system CPU; and wherein said test initiator is sent to one or more of said plurality of central processing units by sharing said one or more storage means with said system CPU.

* * * * *